(12) United States Patent
Bousfield (10) Patent No.: US 10,697,374 B1
(45) Date of Patent: Jun. 30, 2020

(54) HIGHLY LOADED INLET DUCT IN A GEARED TURBOFAN

(71) Applicant: ROLLS-ROYCE plc, London (GB)

(72) Inventor: Ian J Bousfield, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/718,405

(22) Filed: Dec. 18, 2019

(30) Foreign Application Priority Data

Jan. 18, 2019 (GB) .................................. 1900733.5

(51) Int. Cl.
*F02C 7/36* (2006.01)
*F02C 7/057* (2006.01)
*F02C 3/06* (2006.01)
*F02K 3/06* (2006.01)

(52) U.S. Cl.
CPC .................. *F02C 7/36* (2013.01); *F02C 3/06* (2013.01); *F02C 7/057* (2013.01); *F02K 3/06* (2013.01); *F05D 2220/327* (2013.01); *F05D 2260/40311* (2013.01); *F05D 2270/021* (2013.01)

(58) Field of Classification Search
CPC ............. F02C 7/057; F02C 7/036; F02K 3/06
See application file for complete search history.

(56) References Cited

U.S. PATENT DOCUMENTS

| | | | | |
|---|---|---|---|---|
| 3,494,129 A * | 2/1970 | Krebs | .................... | F04D 29/544 60/226.1 |
| 3,971,208 A * | 7/1976 | Schwent | .................... | F02C 9/32 60/773 |
| 4,827,712 A * | 5/1989 | Coplin | .................... | F02K 3/06 415/210.1 |
| 5,174,525 A * | 12/1992 | Schilling | .................... | F02C 7/20 244/54 |
| 7,694,505 B2 * | 4/2010 | Schilling | .................... | F02C 7/36 60/226.1 |

(Continued)

OTHER PUBLICATIONS

Rauch, D. Design Study of an Air Pump and Integral Lift Engine ALF-504 Using the Lycoming 502 Core, NASA-CR-120992, 1972 retrieved from https://ntrs.nasa.gov/archive/nasa/casi.ntrs.nasa.gov/19730004744.pdf. (Year: 1972).*

(Continued)

*Primary Examiner* — Michael Lebentritt
*Assistant Examiner* — Topaz L. Elliott
(74) *Attorney, Agent, or Firm* — Oliff PLC (57) ABSTRACT

A gas turbine engine includes an inlet duct to guide a core engine flow to a compressor and an engine section stator arranged in the inlet duct upstream of the compressor including vanes with leading edges defining a first annulus area in the inlet duct, a mid-span leading edge point of the engine section stator vanes being arranged at a first radius. The compressor includes a first rotor with a row of first blades with leading edges defining a second annulus area; a mid-span leading edge point of the compressor first blades being arranged at a second radius and an axial distance from the engine section stator vane mid-span leading edge point. The ratio of the second to the first annulus area is equal or greater than 0.75, and the ratio of a difference between the first and second radius to the axial distance is equal or greater than 0.23.

16 Claims, 2 Drawing Sheets

(56) References Cited

U.S. PATENT DOCUMENTS

| | | | | |
|---|---|---|---|---|
| 8,863,491 | B2* | 10/2014 | Merry | F01D 25/162 |
| | | | | 60/39.163 |
| 9,194,329 | B2* | 11/2015 | Merry | F01D 25/162 |
| 10,215,094 | B2* | 2/2019 | Merry | F01D 25/162 |
| 2010/0170224 | A1* | 7/2010 | Clark | F01D 5/143 |
| | | | | 60/264 |
| 2013/0195645 | A1* | 8/2013 | Suciu | F02K 3/06 |
| | | | | 415/220 |
| 2014/0186158 | A1* | 7/2014 | Merry | F01D 25/162 |
| | | | | 415/111 |
| 2014/0205439 | A1* | 7/2014 | Merry | F01D 25/162 |
| | | | | 415/124.1 |
| 2015/0345392 | A1* | 12/2015 | Merry | F01D 25/162 |
| | | | | 415/124.1 |
| 2016/0138478 | A1* | 5/2016 | Negulescu | F02K 3/06 |
| | | | | 415/122.1 |
| 2019/0048826 | A1* | 2/2019 | Pointon | F01D 1/02 |
| 2019/0107051 | A1* | 4/2019 | Merry | F01D 25/162 |

OTHER PUBLICATIONS

Cusick, M. Avco Lycoming's ALF 502 High Bypass Fan Engine, SAE Technical Paper Series 810618. Business Aircraft Meeting & Exposition 1981. (Year: 1981).*

Leyes, R. and Fleming, W. "The History of North American Small Gas Turbine Aircraft Engines" Smithsonian: 1999. (Year: 1999).*

* cited by examiner

HIGHLY LOADED INLET DUCT IN A GEARED TURBOFAN

The present disclosure relates generally to gas turbine engines, and more specifically to geared gas turbine engines.

Gas turbine engines are used to power aircraft, watercraft, power generators, and the like. A gas turbine engine generally comprises, in axial flow series, an air intake, a fan rotating about a principal rotational axis, one or more compressors, a combustor, one or more turbines, and an exhaust nozzle. Air entering the air intake is accelerated by the fan to produce two air flows: a first air flow (core flow) into a core and a second air flow (bypass flow) which passes through a bypass duct to provide propulsive thrust.

Air entering the core through an inlet duct is guided by an engine section stator (ESS) or core inlet stator towards the compressor where it is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The mass ratio between the bypass flow and the core flow is known as the bypass ratio. At subsonic aircraft velocities, a large bypass ratio is desirable for high propulsive efficiency.

Recently, geared turbofans have been proposed. In a geared turbofan, a compressor is coupled to the fan via a reduction gearbox, which allows the fan to rotate slower than the compressor. As the fan rotates slower, the fan diameter can be increased and so the bypass ratio.

There are numerous competing requirements and parameters for aircraft gas turbine engines. They must have low fuel burn, whilst also being lightweight and have small dimensions.

This de-coupling of the fan speed from the compressor speed opens the design space for the fan and the core considerably. Consequently, the dimensions of conventional gas turbine engine cores and fans may be non-optimal where a reduction gearbox is introduced.

For example, as the compressor rotates faster, the blade speed may exceed an optimal value leading to high Mach numbers, poor efficiency and greater noise. Consequently, the compressor is generally moved radially inward to reduce the blade speed.

Moreover, limited radius change is possible between the fan trailing edge and the ESS. Because the ESS radial position is mainly determined by the fan size, as the fan diameter increases, the ESS is moved radially outwardly to reduce the radius change between the fan trailing edge and the ESS.

In other words, the difference in radius between the compressor and the ESS increases in a geared turbofan. To cope with such increased difference in radius the inlet duct is made longer and this results in a heavier, less efficient and more expensive engine.

There is therefore a need for a geared gas turbine engine with an improved inlet duct such as to overcome, at least in part, the above mentioned disadvantages.

According to a first aspect, there is provided a gas turbine engine comprising: a fan mounted to rotate about a main longitudinal axis to produce a bypass flow and a core flow; an engine core, comprising in axial flow series a compressor, a combustor, and a turbine coupled to the compressor through a shaft; an inlet duct to guide the core flow to the compressor; a reduction gearbox that receives an input from the shaft and outputs drive to the fan so as to drive the fan at a lower rotational speed than the shaft; an engine section stator arranged in the inlet duct upstream of the compressor, the engine section stator comprising a plurality of vanes with respective leading edges defining a first annulus area A1 in the inlet duct, a mid-span leading edge point of the engine section stator vanes being arranged at a first radius R1 from the main longitudinal axis; wherein the compressor comprises a first rotor with a row of first blades with respective leading edges defining a second annulus area A2 in the inlet duct; a mid-span leading edge point of the compressor first blades being arranged at a second radius R2 from the main longitudinal axis and at an axial distance L from the engine section stator vane mid-span leading edge point; wherein a ratio A2/A1 of the second annulus area A2 to the first annulus area A1 is equal or greater than 0.60, and a ratio ΔR/L of a difference ΔR between the first radius R1 and the second radius R2 to the axial distance L is equal or greater than 0.23.

The blades may comprise an aerofoil portion with a tip, and a root, and a spanwise direction is a direction extending between the tip and the root of the blades, and a chordwise direction is a direction extending between the leading edge and the trailing edge of the blades.

In the present disclosure, upstream and downstream are with respect to the core flow through the compressor; and front and rear is with respect to the gas turbine engine, i.e. the fan being in the front and the turbine being in the rear of the engine.

The present inventor has found a unique parameter combination for the inlet duct that allows optimizing efficiency, weight and dimensions of the gas turbine engine, without negatively affecting the core flow in the inlet duct in terms of flow properties.

The ratio ΔR/L describes a mean slope of the inlet duct. In the present disclosure, such ratio is relatively high, enabling a shorter duct length, and therefore a shorter and lighter engine, while maintain an optimum compressor blade speed, gear ratio, and bypass ratio. In other words, the fan size can be optimised for maximum thrust and efficiency, and the compressor can be arranged distanced to the main longitudinal axis to optimise the compressor blade speed.

The ratio A2/A1 of the second annulus area A2 to the first annulus area A1 describes the mean axial diffusion along the inlet duct and a ratio less than 1 implies an accelerating duct. It is usually the static pressure gradient along an inner annulus of the inlet duct which determines how difficult it is for the core flow to flow in the inlet duct. The static pressure gradient increases with the mean axial diffusion, so the ratio A2/A1 of the second annulus area A2 to the first annulus area A1 is an indication of such difficulty. Also the ratio ΔR/L has an influence on the static pressure gradient along the inlet duct: the higher the ratio ΔR/L, the higher the static pressure gradient. The unique combination of the ratio A2/A1 and the ratio ΔR/L of the present disclosure enables to keep the static pressure gradient at an acceptable level while optimizing efficiency, weight and dimensions of the gas turbine engine as explained above.

In some examples, the ratio ΔR/L of the difference between the first radius and the second radius to the axial distance L may be equal or greater than 0.25, or equal or greater than 0.27, or equal or greater than 0.30, or equal or greater than 0.31, or equal or greater than 0.32, or equal or greater than 0.33, or equal or greater than 0.34, or equal or greater than 0.35, or equal or greater than 0.35, or equal or greater than 0.36, or equal or greater than 0.37, or equal or greater than 0.38, or equal or greater than 0.39, or equal or greater than 0.40, or equal or greater than 0.42, or equal or greater than 0.44, or equal or greater than 0.46, or equal or greater than 0.48, or equal or greater than 0.50. In some examples, the ratio ΔR/L of the difference between the first radius and the second radius to the axial distance L may be equal or less than 0.70, or equal or less than 0.68, or equal or less than 0.66, or equal or less than 0.64, or equal or less than 0.62, or equal or less than 0.6, or equal or less than 0.58, or equal or less than 0.56, or equal or less than 0.54, or equal or less than 0.52, or equal or less than 0.50. For example, the ratio ΔR/L may be comprised between 0.30 and 0.70, or between 0.30 and 0.50 or between 0.35 and 0.70, or between 0.40 and 0.70, or between 0.35 and 0.65, or between 0.35 and 0.60, or between 0.35 and 0.55, or between 0.40 and 0.60, or between 0.40 and 0.55. By limiting the ratio ΔR/L to values of, or less than, 0.70 it may be possible to reduce the risk of flow separation within the inlet duct due to large adverse pressure gradients.

The ratio A2/A1 of the second annulus area A2 to the first annulus area A1 may be equal or greater than 0.65, or equal or greater than 0.70, or equal or greater than 0.75, or equal or greater than 0.80, or equal or greater than 0.85, or equal or greater than 0.90, or equal or greater than 0.95. Moreover, the ratio A2/A1 of the second annulus area A2 to the first annulus area A1 may be equal or less than 1.10, or equal or less than 1.05, or equal or less than 1, or equal or less than 0.95, or equal or less than 0.90. For example, the ratio A2/A1 may be comprised between 0.60 and 1.10, or between 0.60 and 1.05, or between 0.60 and 1, or between 0.60 and 0.90, or between 0.60 and 0.95, or between 0.60 and 0.90, or between 0.65 and 1.10, or between 0.65 and 1, or between 0.65 and 0.90, or between 0.65 and 0.85, or between 0.70 and 1.10, or between 0.70 and 1, or between 0.70 and 0.90, or between 0.75 and 1.10, or between 0.75 and 1, or between 0.75 and 0.95, or between 0.80 and 1.10, or between 0.80 and 1.

The gas turbine engine may comprise a variable inlet guide vane arranged in the inlet duct between the engine section stator and the first rotor of the compressor.

The gas turbine engine may comprise a strut arranged in the inlet duct between the engine section stator and the first rotor of the compressor.

The strut may be arranged between the engine section stator and the variable inlet guide vane. In other words, the strut may be arranged downstream of the engine section stator and upstream of the variable inlet guide vane and the first rotor.

The present disclosure may relate to relatively large gas turbine engines, i.e. to gas turbine engines with relatively large fan diameter. For example, the fan may have a diameter greater than 230 cm, or greater than 235 cm, or greater than 240 cm, or greater than 245 cm, or greater than 250 cm.

The reduction gearbox may have a gear ratio comprised between 2.5 and 4.2, for example between 3.0 and 4.0, or between 3.1 and 3.7, or between 3.5 and 3.8.

The compressor may comprise a plurality of stages, each stage comprising a rotor and a stator. The compressor may comprise two or more stages, for example three or four stages.

The compressor may comprise less than ten stages, or less than nine stages. For example, the compressor may comprise 2 to 8 stages.

The compressor may be an intermediate pressure compressor and the gas turbine engine may comprise a high pressure compressor downstream of the intermediate pressure compressor.

Moreover, the turbine may be an intermediate pressure turbine and the gas turbine engine may comprise a high pressure turbine upstream of the intermediate pressure compressor.

The shaft may be a first shaft and the gas turbine engine may further comprise a second shaft coupling the high pressure turbine to the high pressure compressor. The first shaft may couple the intermediate pressure compressor and the intermediate pressure turbine.

The gas turbine engine may have a bypass ratio, defined as a mass ratio between the bypass flow and the core engine flow, higher than 10.

According to a second aspect, there is provided a gas turbine engine comprising a fan mounted to rotate about a main longitudinal axis to produce a bypass flow and a core engine flow; an engine core, comprising in axial flow series a compressor, a combustor, and a turbine coupled to the compressor through a shaft; an inlet duct to guide the core engine flow to the compressor; a reduction gearbox that receives an input from the shaft and outputs drive to the fan so as to drive the fan at a lower rotational speed than the shaft, the reduction gearbox having a gear ratio comprised between 3.1 and 3.7; and an engine section stator arranged in the inlet duct upstream of the compressor, the engine section stator comprising a plurality of vanes with respective leading edges, a mid-span leading edge point of the engine section stator vanes being arranged at a first radius R1 from the main longitudinal axis. The compressor comprises a first rotor with a row of first blades with respective leading edges; a mid-span leading edge point of the compressor first blades being arranged at a second radius R2 from the main longitudinal axis and at an axial distance L from the engine section stator vane mid-span leading edge point. A ratio ΔR/L of a difference ΔR between the first radius and the second radius to the axial distance L is comprised between 0.23 and 0.70, optionally between 0.25 and 0.70.

As said before, arrangements of the present disclosure may be particularly beneficial for fans that are driven via a gearbox. Accordingly, the gas turbine engine may comprise a gearbox that receives an input from a core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm (around 90.5 inches), 235 cm (around 92.5 inches), 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 230 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the first and second aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
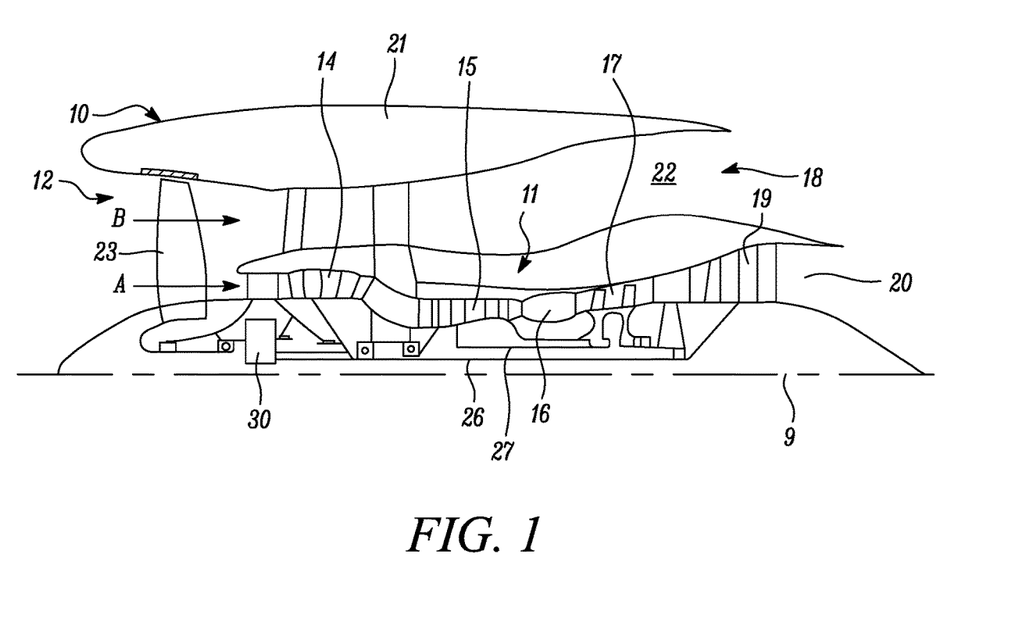
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

The fan 23 may have a diameter of at least 390 cm, for example a diameter of 410 cm.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
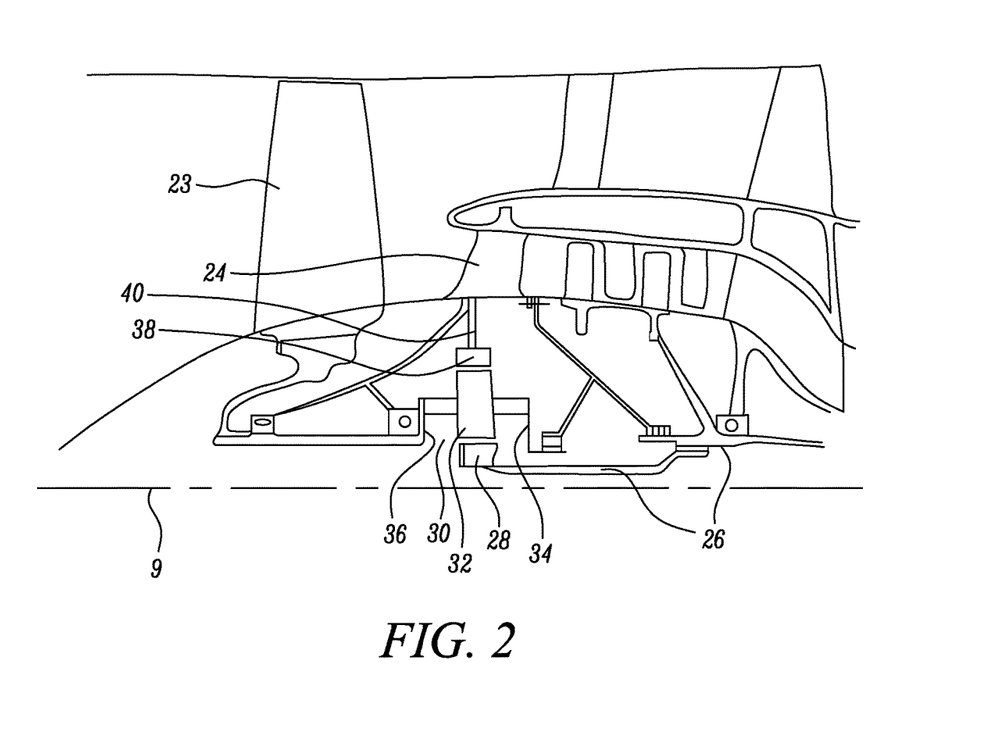
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
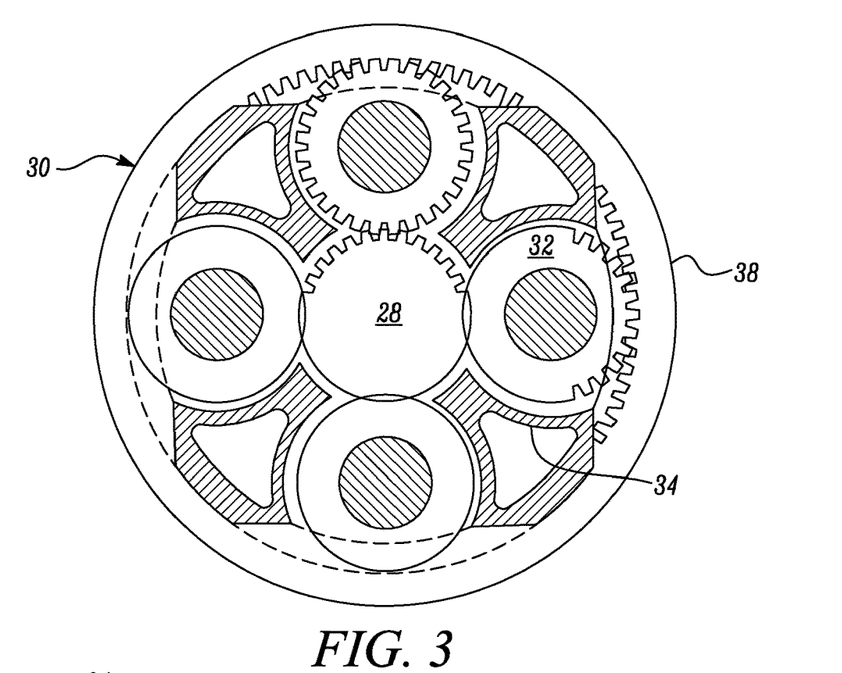
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

The gearbox 30 may have a reduction gear ratio comprised between 2.5 and 4.2, for example between 3.6 and 3.8. In other words, the interconnecting shaft 26, which is the input of the gearbox 30, rotates between 2.5 and 4.2, for example 3.6, times faster than the fan 23, either that the fan 23 is rotated by the planet carrier 34 or the ring gear 38 depending on the type of epicyclic gearbox 30.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
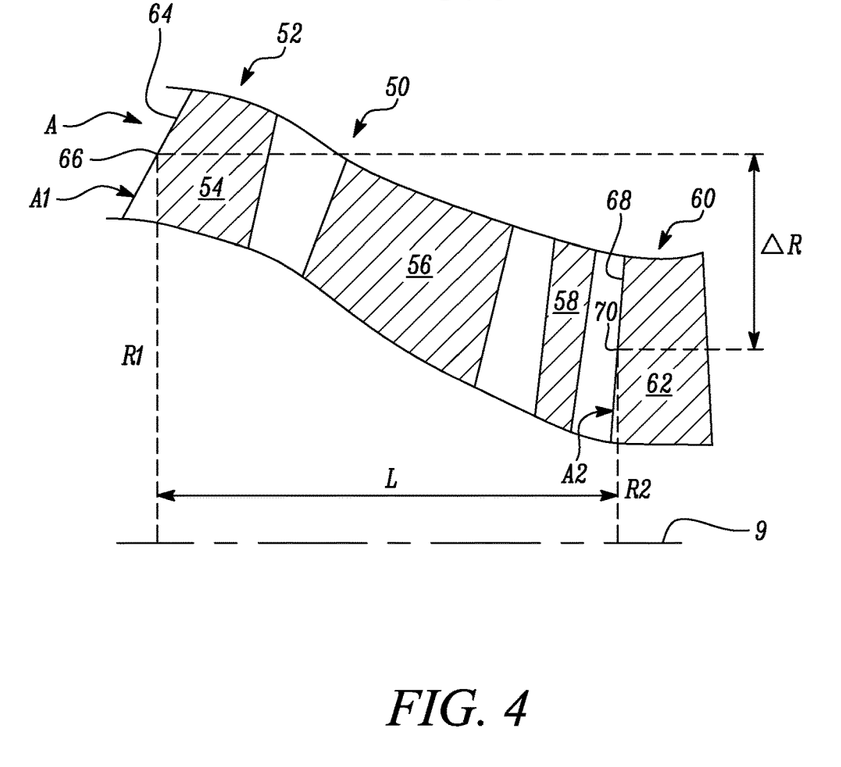
FIG. 4 is a schematic, sectional view of an inlet duct of a gas turbine engine.

FIG. 4 illustrates an inlet duct 50 through which the core flow A enters the core of the gas turbine engine 10.

Arranged in the inlet duct 50, there are in flow series an engine stator section (ESS) 52 with a plurality of vanes 54, a strut 56, variable inlet guide vanes (VIGV) 58, and a first rotor 60 of the low pressure compressor 14 with a plurality of first blades 62.

In alternative, not illustrated embodiments, the strut 56 may be omitted.

The vanes 54 of the ESS 52 feature respective leading edges 64, a mid-span point 66 of which is arranged at a first radius R1 from the main longitudinal axis 9. A first annulus area A1 is defined at the leading edge 64.

The first blades 62 are arranged downstream of the ESS 52 and feature respective leading edges 68, a mid-span point 70 of which is arranged at a second radius R2 from the main longitudinal axis 9. A second annulus area A2 is defined at the leading edge 68 of the first blades 62. In the illustrated embodiment the second annulus area A2 is larger than the first annulus area A1, leading to a ratio A2/A1 larger than 1. In non-illustrated embodiments, the second annulus area A2 may be less than the first annulus area A1, leading to a ratio A2/A1 less than 1 and an accelerating inlet duct. In embodiments, the ratio A2/A1 may be equal to 1, or equal to 0.95.

The ESS leading edge mid-span point 66 and the first blade leading edge mid-span point 70 are separated by an axial distance L. L represents an axial length of the inlet duct 50. Moreover, the ESS leading edge mid-span point 66 and the first blade leading edge mid-span point 70 are separated by a radial distance, which is the difference ΔR between the first radius R1 and the second radius R2.

The ratio of the difference ΔR between the first radius R1 and the second radius R2 to the axial distance L represents a mean slope of the inlet duct 50 and is related to the inlet duct curvature. In the present embodiment, ΔR/L is greater than 0.3, for example between 0.35 and 0.55, for example about 0.42. In other words, the inlet duct 50 has a relatively high mean slope allowing the first radius R1 to be relatively large, such that the ESS may be optimised for a relatively large fan diameter with high bypass ratio, and the second radius R2 to be relatively short, such that the compressor blade tip does not rotate at high Mach numbers that would lead to poor efficiency and greater noise, and turbine temperatures may be increased leading to increased efficiency. Moreover, a relatively high mean slope allows at the same time a relatively short (and therefore light) inlet duct 50 (and therefore gas turbine engine).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
a fan mounted to rotate about a main longitudinal axis to produce a bypass flow and a core engine flow;
an engine core, comprising in axial flow series a compressor, a combustor, and a turbine coupled to the compressor through a shaft;
an inlet duct to guide the core engine flow to the compressor;
a reduction gearbox that receives input from the shaft and outputs drive to the fan so as to drive the fan at a lower rotational speed than the shaft;
an engine section stator arranged in the inlet duct upstream of the compressor, the engine section stator comprising a plurality of vanes with respective leading edges defining a first annulus area A1 in the inlet duct, mid-span leading edge points of the engine section stator vanes being arranged at a first radius R1 from the main longitudinal axis;
wherein the compressor comprises a first rotor with a row of first blades with respective leading edges defining a second annulus area A2 in the inlet duct, mid-span leading edge points of the compressor first blades being arranged at a second radius R2 from the main longitudinal axis and at an axial distance L from the engine section stator vane mid-span leading edge points, and
wherein a ratio of the second annulus area A2 to the first annulus area A1 is equal or greater than 0.80, and a ratio ΔR/L of a difference ΔR between the first radius and the second radius to the axial distance L is equal or greater than 0.23.

2. The gas turbine engine according claim 1, wherein the ratio ΔR/L of the difference ΔR between the first radius and the second radius to the axial distance L is equal or greater than 0.25.

3. The gas turbine engine according to claim 1, wherein the ratio ΔR/L of the difference between the first radius and the second radius to the axial distance L is equal or less than 0.70.

4. The gas turbine engine according to claim 1, wherein the ratio ΔR/L of the difference between the first radius and the second radius to the axial distance L is equal or less than 0.68.

5. The gas turbine engine according to claim 1, wherein the ratio of the second annulus area A2 to the first annulus area A1 is equal or less than 1.10.

6. The gas turbine engine according to claim 1, wherein the ratio of the second annulus area A2 to the first annulus area A1 is equal or less than 1.05.

7. The gas turbine engine according to claim 1, comprising a variable inlet guide vane arranged in the inlet duct between the engine section stator and the first rotor of the compressor.

8. The gas turbine engine according to claim 7, comprising a strut arranged in the inlet duct between the engine section stator and the first rotor of the compressor.

9. The gas turbine engine according to claim 8, wherein the strut is arranged between the engine section stator and the variable inlet guide vane.

10. The gas turbine engine according to claim 1, wherein the fan has a diameter greater than 230 cm.

11. The gas turbine engine according to claim 1, wherein the reduction gearbox has a gear ratio comprised between 2.5 and 4.2.

12. The gas turbine engine according to claim 1, wherein the compressor comprises 2 to 8 stages.

13. The gas turbine engine according to claim 1, wherein a bypass ratio, defined as a mass ratio between the bypass flow and the core engine flow, is higher than 10.

14. The gas turbine engine according to claim 1, wherein:
the compressor is an intermediate pressure compressor, the gas turbine engine further comprising a high pressure compressor downstream of the intermediate pressure compressor;
the turbine is an intermediate pressure turbine, the gas turbine engine further comprising a high pressure turbine upstream of the intermediate pressure turbine; and
the shaft is a first shaft, the gas turbine engine further comprising a second shaft coupling the high pressure turbine to the high pressure compressor.

15. A gas turbine engine comprising:
a fan mounted to rotate about a main longitudinal axis to produce a bypass flow and a core engine flow;
an engine core, comprising in axial flow series a compressor, a combustor, and a turbine coupled to the compressor through a shaft;
an inlet duct to guide the core engine flow to the compressor;
a reduction gearbox that receives input from the shaft and outputs drive to the fan so as to drive the fan at a lower rotational speed than the shaft, the reduction gearbox having a gear ratio comprised between 3.1 and 3.7;
an engine section stator arranged in the inlet duct upstream of the compressor, the engine section stator comprising a plurality of vanes with respective leading edges, mid-span leading edge points of the engine section stator vanes being arranged at a first radius R1 from the main longitudinal axis;
wherein the compressor comprises a first rotor with a row of first blades with respective leading edges, mid-span leading edge points of the compressor first blades being arranged at a second radius R2 from the main longitudinal axis and at an axial distance L from the engine section stator vane mid-span leading edge points, and
wherein a ratio ΔR/L of a difference ΔR between the first radius and the second radius to the axial distance L is comprised between 0.40 and 0.70.

16. The gas turbine engine according to claim 15, wherein the compressor comprises 2 to 8 stages.

* * * * *